United States Patent
Lee et al.

(10) Patent No.: US 9,634,696 B2
(45) Date of Patent: Apr. 25, 2017

(54) TRANSMITTER FOR SUPPORTING MULTIMODE AND MULTIBAND USING MULTIPLE RADIO FREQUENCY (RF) DIGITAL-TO-ANALOG CONVERTERS (DAC) AND CONTROL METHOD OF THE TRANSMITTER

(71) Applicants: SAMSUNG ELECTRONICS CO., LTD., Suwon-si (KR); POSTECH ACADEMY-INDUSTRY FOUNDATION, Pohang-si (KR)

(72) Inventors: Nam Jeong Lee, Yongin-si (KR); Bum Man Kim, Pohang-si (KR); Dong Soo Kim, Pohang-si (KR); Ha Dong Jin, Pohang-si (KR); Byung Chang Kang, Yongin-si (KR); Jong Ho Bang, Suwon-si (KR); Byung Moo Lee, Seoul (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 150 days.

(21) Appl. No.: 14/272,638

(22) Filed: May 8, 2014

(65) Prior Publication Data

US 2014/0335804 A1 Nov. 13, 2014

(30) Foreign Application Priority Data

May 13, 2013 (KR) ........................ 10-2013-0053759

(51) Int. Cl.
*H04B 1/04* (2006.01)

(52) U.S. Cl.
CPC ................................. *H04B 1/0458* (2013.01)

(58) Field of Classification Search
CPC ....................................................... H04B 1/0458
USPC .................................. 455/552.1, 553.1, 103
See application file for complete search history.

(56) References Cited

U.S. PATENT DOCUMENTS

| | | |
|---|---|---|
| 2003/0218514 A1 | 11/2003 | Eckl et al. |
| 2005/0206564 A1 | 9/2005 | Mao et al. |
| 2008/0107213 A1* | 5/2008 | Gupta et al. .................. 375/340 |
| 2008/0119153 A1 | 5/2008 | Sugiyama et al. |
| 2008/0122553 A1 | 5/2008 | McKinzie |

(Continued)

FOREIGN PATENT DOCUMENTS

| | | |
|---|---|---|
| EP | 2 501 095 A1 | 9/2012 |
| JP | 9-83398 A | 3/1997 |

(Continued)

*Primary Examiner* — Yuwen Pan
*Assistant Examiner* — Xin Jia
(74) *Attorney, Agent, or Firm* — NSIP Law

(57) ABSTRACT

A transmitter configured to support a multimode and a multiband, using radio frequency (RF) digital-to-analog converters (DACs), includes a first RF DAC configured to transmit a first signal in a first frequency band, and a second RF DAC configured to transmit a second signal in a second frequency band different from the first frequency band. The transmitter further includes an impedance controller configured to adjust impedance of one of the first RF DAC and the second RF DAC operating in an impedance matching mode to adjust a frequency range of another one of the first RF DAC and the second RF DAC operating in a data transmission mode.

23 Claims, 8 Drawing Sheets

(56) References Cited

U.S. PATENT DOCUMENTS

| | | |
|---|---|---|
| 2010/0265112 A1 | 10/2010 | Ek et al. |
| 2011/0043285 A1* | 2/2011 | Zhao .................. H03F 1/42 |
| | | 330/277 |
| 2011/0269416 A1 | 11/2011 | Kadoi et al. |
| 2012/0105147 A1* | 5/2012 | Harris et al. .............. 330/57 |
| 2013/0285873 A1* | 10/2013 | Dupuy et al. ............ 343/852 |
| 2014/0049318 A1* | 2/2014 | Goswami ................. 330/253 |
| 2014/0194075 A1* | 7/2014 | Black et al. ............... 455/77 |

FOREIGN PATENT DOCUMENTS

| | | |
|---|---|---|
| JP | 11-41118 A | 2/1999 |
| JP | 2008-17415 A | 1/2008 |
| JP | 2012-227881 A | 11/2012 |

* cited by examiner

US 9,634,696 B2

TRANSMITTER FOR SUPPORTING MULTIMODE AND MULTIBAND USING MULTIPLE RADIO FREQUENCY (RF) DIGITAL-TO-ANALOG CONVERTERS (DAC) AND CONTROL METHOD OF THE TRANSMITTER

CROSS-REFERENCE TO RELATED APPLICATION

This application claims the benefit under 35 USC 119(a) of Korean Patent Application No. 10-2013-0053759, filed on May 13, 2013, in the Korean Intellectual Property Office, the entire disclosure of which is incorporated herein by reference for all purposes.

BACKGROUND

1. Field

The following description relates to a transmitter that supports a multimode and a multiband, using a plurality of radio frequency (RF) digital-to-analog converters (DACs), and a control method of the transmitter.

2. Description of Related Art

Communication providers may use discontinuous frequency bands to support a variety of communication services, such as second generation (2G) communication, third generation (3G) communication, long term evolution (LTE) communication, and wireless broadband Internet (WiBro) communication, for example. Accordingly, a communication apparatus suitable for each frequency band and each communication system is needed to achieve more efficient communication. In general, digital orthogonal transmitters using a radio frequency (RF) digital-to-analog converter (DAC) may support only a narrow band optimized for a predetermined frequency and a predetermined communication system, and thus, output power and efficiency performance in other frequency bands may be degraded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a transmitter configured to support a multimode and a multiband, using radio frequency (RF) digital-to-analog converters (DACs), includes a first RF DAC configured to transmit a first signal in a first frequency band, and a second RF DAC configured to transmit a second signal in a second frequency band different from the first frequency band. The transmitter further includes an impedance controller configured to adjust impedance of one of the first RF DAC and the second RF DAC operating in an impedance matching mode to adjust a frequency range of another one of the first RF DAC and the second RF DAC operating in a data transmission mode.

Each of the first RF DAC and the second RF DAC may include capacitors configured to be a capacitive power combiner.

The impedance controller may include a look-up table configured to store impedance values pre-calculated for each of frequency bands based on a number of the capacitors comprised in each of the first RF DAC and the second RF DAC.

The look-up table may be further configured to store control values to be used to control the first RF DAC and the second RF DAC, based on the impedance values.

The impedance controller may be configured to generate a control signal to be used to control the first RF DAC and the second RF DAC, based on the control values.

In response to the control signal indicating that the first RF DAC is to transmit the first signal, the impedance controller may be configured to apply, to the second RF DAC, an impedance control signal to control a frequency range of the first frequency band.

The impedance controller may be configured to control the capacitors comprised in the second RF DAC by applying the impedance control signal to the second RF DAC.

In response to the control signal indicating that the second RF DAC is to transmit the second signal, the impedance controller may be configured to apply, to the first RF DAC, an impedance control signal to control a frequency range of the second frequency band.

The impedance controller may be configured to control the capacitors comprised in the first RF DAC by applying the impedance control signal to the first RF DAC.

The transmitter may include a third RF DAC configured to transmit a third signal in a third frequency band different from the first frequency band and the second frequency band. In response to the control signal indicating that the third RF DAC is to transmit the third signal, the impedance controller may be configured to apply, to the first RF DAC and the second RF DAC, an impedance control signal to control a frequency range of the third frequency band.

The first RF DAC and the second RF DAC may be configured to complementarily operate based on the data transmission mode and the impedance matching mode, respectively.

The first frequency band may be for long term evolution (LTE) communication, and the second frequency band may be for wideband code division multiple access (WCDMA) communication.

In another general aspect, a control method of a transmitter configured to support a multimode and a multiband, using radio frequency (RF) digital-to-analog converters (DACs), includes selecting one of a first RF DAC configured to operate in a first frequency band and a second RF DAC configured to operate in a second frequency band different from the first frequency band, to operate in a data transmission mode, based on a target frequency band in which data is to be transmitted. The method further includes transmitting a data signal to be transmitted, to the selected one of the first RF DAC and the second RF DAC, and adjusting impedance of another one of the first RF DAC and the second RF DAC operating in an impedance matching mode to adjust a frequency range of the selected one of the first RF DAC and the second RF DAC operating in the data transmission mode.

The method may further include maintaining a look-up table configured to store impedance values pre-calculated for each of frequency bands based on a number of capacitors comprised in each of the first RF DAC or the second RF DAC.

The adjusting may include generating a control signal to be used to control the other one of the first RF DAC and the second RF DAC operating in the impedance matching mode, based on the control values.

A non-transitory computer-readable storage medium may store a program including instructions to cause a computer to perform the method.

In still another general aspect, a transmitter includes a first digital-to-analog converter (DAC) configured to operate in a first frequency band, and a second DAC configured to operate in a second frequency band. The transmitter further includes an impedance controller configured to select one of the first DAC and the second DAC to transmit data, based on a target frequency band in which the data is to be transmitted, and adjust impedance of another one of the first DAC and the second DAC to adjust a frequency range of the selected one of the first DAC and the second DAC.

The impedance controller may include a first switch connected to the first DAC, and a second switch connected to the second DAC.

The impedance controller may be configured to control the first switch to apply the data to the first DAC, and control the second switch to apply an impedance control signal to the second DAC to adjust the first frequency band, in response to the target frequency band being equal to the first frequency band.

The impedance controller may be configured to control the second switch to apply the data to the second DAC, and control the first switch to apply an impedance control signal to the first DAC to adjust the second frequency band, in response to the target frequency band being equal to the second frequency band.

Other features and aspects will be apparent from the following detailed description, the drawings, and the claims.

Figure 1:
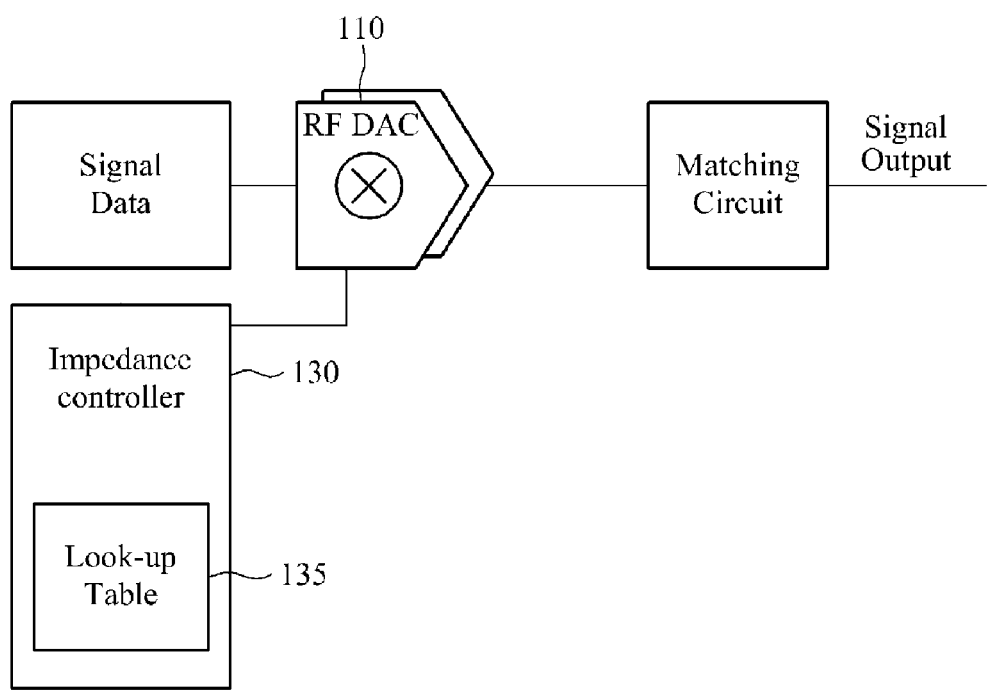
FIG. 1 is a block diagram illustrating an example of a transmitter that supports a multimode and a multiband, using a plurality of radio frequency (RF) digital-to-analog converters (DACs).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a transmitter that supports a multimode and a multiband, using a plurality of radio frequency (RF) digital-to-analog converters (DACs) 110. Referring to FIG. 1, the transmitter includes the RF DACs 110 and an impedance controller 130.

Each of the RF DACs 110 is configured to transmit signal data in a predetermined frequency band to a matching circuit that outputs a signal output. Each of the RF DACs 110 may operate in a data transmission mode and an impedance matching mode. The RF DACs 110 may complementarily operate based on the data transmission mode and the impedance matching mode, respectively.

In the data transmission mode, a corresponding one of the RF DACs 110 transmits the signal data in the predetermined frequency band. In the impedance matching mode, another corresponding one of the RF DACs 110 performs impedance matching in order to adjust an operating frequency range of the one of the RF DACs 110 that operates in the data transmission mode.

The other one of the RF DACs 110 that operates in the impedance matching mode may perform impedance matching for the one of the RF DACs 110 that operates in the data transmission mode by controlling capacitors of the one of the RF DACs 110 that operates in the data transmission mode. Each of the RF DACs 110 may include a plurality of capacitors that form a capacitive power combiner structure.

The impedance controller 130 controls an operation mode of each of the RF DACs 110 based on a target frequency band in which the signal data is to be transmitted. The impedance controller 130 includes a look-up table 135. The look-up table 135 stores impedance values pre-calculated for each frequency band based on a number of the capacitors included in each of the RF DACs 110.

For example, the transmitter may include a first RF DAC and a second RF DAC, and each of the first RF DAC and the second RF DAC may include five capacitors that form a capacitive power combiner structure. In this example, the look-up table 135 may store impedance values pre-calculated for each frequency band based on a number of the capacitors of the first RF DAC to which power voltage (VDD) is applied, such as an example in which power voltage is applied to a first capacitor of the first RF DAC, an example in which power voltage is applied to the first capacitor and a second capacitor of the first RF DAC, and an example in which power voltage is applied to the first capacitor, the second capacitor, and a third capacitor of the first RF DAC, for example. Similarly, the look-up table 135 may store impedance values pre-calculated for each frequency band based on a number of the capacitors of the second RF DAC to which power voltage is applied.

In this example, power voltage may be applied to each capacitor based on a digital input value applied to each of the RF DACs 110. For example, when a digital input value of "1" is input, the power voltage may be applied to a capacitor. When a digital input value of "0" is input, ground (GND) voltage may be applied to a capacitor.

The look-up table 135 stores control values to be used by the impedance controller 130 to control an on/off operation of each of the RF DACs 110, for example, to control each of the RF DACs 110 to be turned on or off, based on the impedance values pre-calculated for each frequency band.

The impedance controller 130 may control the capacitors included in the other one of the RF DACs 110 that operates in the impedance matching mode to maintain impedance of the one of the RF DACs 110 that operates in the data transmission mode in the predetermined frequency band at all times. The other one of the RF DACs 110 that operates in the impedance matching mode may be appropriately turned on or off based on an impedance control signal of the impedance controller 130 to provide an adaptive impedance value for the one of the RF DACs 110 that operates in the data transmission mode.

Figure 2:
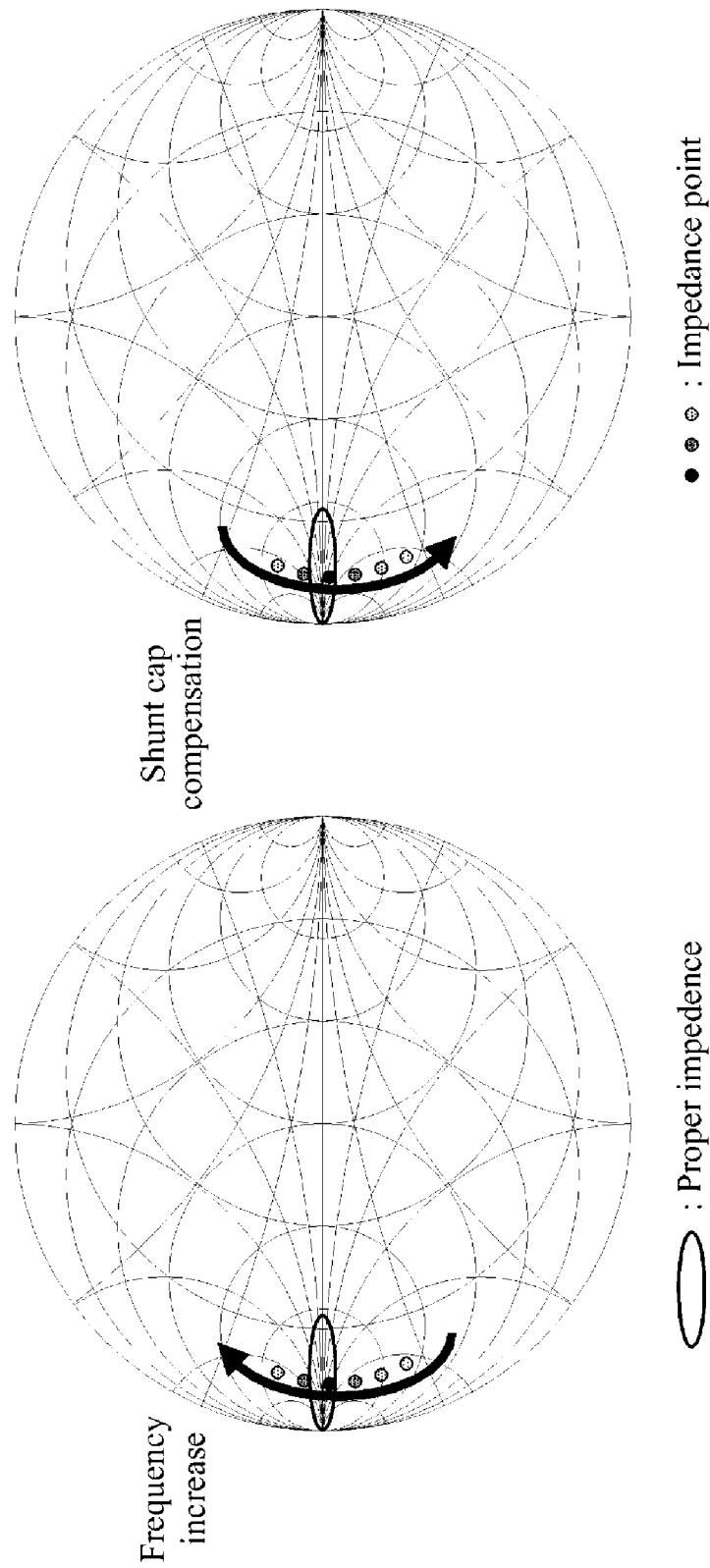
FIG. 2 is a diagram illustrating an example of an operation principle of a transmitter that supports a multimode and a multiband, using a plurality of RF DACs.

FIG. 2 illustrates an example of an operation principle of a transmitter that supports a multimode and a multiband using a plurality of RF DACs. Referring to FIG. 2, matching impedance moves a channel window, for example, impedance points, according to an increase in an operating frequency of the transmitter. The transmitter may maintain the operating frequency as a frequency band that is proper for the moved channel window by compensating for impedance through shunt capacitors.

Impedance may be compensated for by controlling an operation of a plurality of capacitors included in each of the RF DACs and that form a capacitive power combiner structure. The capacitors that form the capacitive power combiner structure may perform the same functionality as, for example, variable shunt capacitors. A shunt capacitor may refer to a capacitor that is attached on an outside of a single RF DAC, and may adjust impedance of the RF DAC. When a separate capacitor is further attached on the outside of the RF DAC, a separate chip area is occupied, and cost increases.

Accordingly, a portion of the RF DACs that transmit signals may perform the same functionality as shunt capacitors, and thus, impedance may be adjusted without using a separate shunt capacitor. For example, RF DACs that operated in an impedance matching mode may perform the same functionality as shunt capacitors, and thus, communication may be performed using a single transmitter even in a different communication frequency. As such, cost may be saved.

Figure 3:
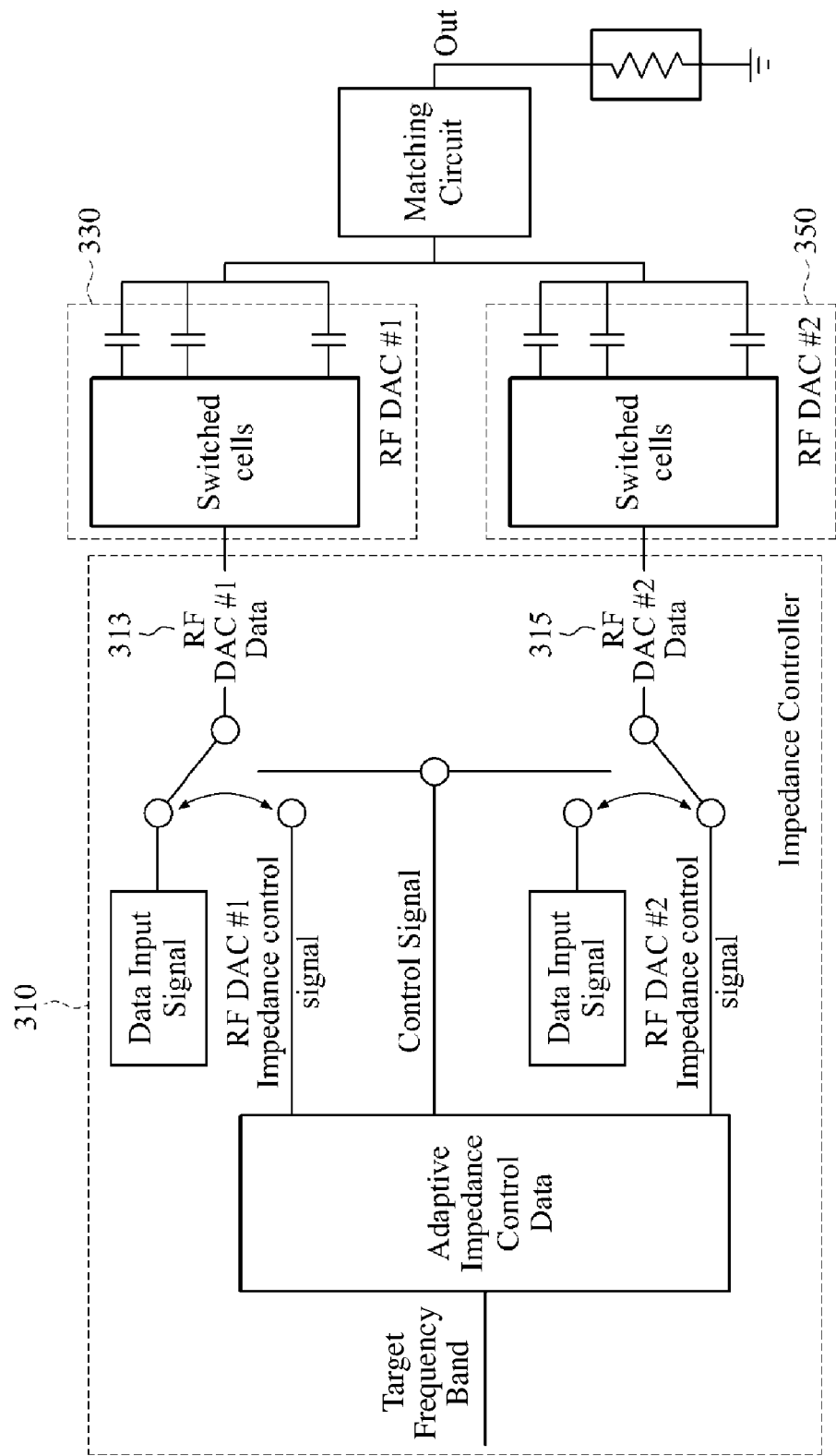
FIG. 3 is a circuit diagram illustrating an example of a transmitter that supports a multimode and a multiband, using a plurality of RF DACs.

FIG. 3 illustrates an example of a transmitter that supports a multimode and a multiband, using a plurality of RF DACs 330 and 350. Referring to FIG. 3, the transmitter includes an impedance controller 310, the first RF DAC 330 (RF DAC #1), and the second RF DAC 350 (RF DAC #2).

The impedance controller 310 uses control values stored in the look-up table 135 of FIG. 1 (e.g., adaptive impedance control data of FIG. 3) to control the first RF DAC 330 and the second RF DAC 350. The look-up table 135 stores impedance values pre-calculated for each frequency band, and the control values determined based on the impedance values.

That is, the impedance controller 310 controls an operation mode of each of the RF DACs 330 and 350 between a data transmission mode and an impedance matching mode. An RF DAC that operates in the impedance matching mode is also referred to as an impedance compensator.

In detail, the impedance controller 310 receives information of a target frequency band of a data input signal to be transmitted. The impedance controller 310 determines impedance values based on the target frequency band, and determines control values based on the impedance values, using the adaptive impedance control data. The impedance controller 310 generates a control signal, a first impedance control signal (RF DAC #1), and a second impedance control signal (RF DAC #2) based on the control values. The control signal may indicate that the first RF DAC 330 is to transmit the data input signal (and the second impedance control signal is to be applied to the second RF DAC 350), or that the second RF DAC 350 is to transmit the data input signal (and the first impedance control signal is to be applied to the first RF DAC 330).

The impedance controller 310 includes a first switch 313 connected to the first RF DAC 330 and that transfers RF DAC #1 data (the data input signal or the first impedance control signal), and a second switch 315 connected to the second RF DAC 350 and that transfers RF DAC #2 data (the data input signal or the second impedance control signal). The first switch 313 applies the data input signal or the first impedance control signal to the first RF DAC 330 based on the control signal. The second switch 315 applies the data input signal or the second impedance control signal to the second RF DAC 350 based on the control signal.

The first RF DAC 330 transmits a first signal (the data input signal) in a first frequency band. The first frequency band may be prepared for, for example, long term evolution (LTE) communication.

The second RF DAC 350 transmits a second signal (the data input signal) in a second frequency band that is different from the first frequency band. The second frequency band may be prepared for, for example, wideband code division multiple access (WCDMA) communication.

Each of the first RF DAC 330 and the second RF DAC 350 may include an identical circuit configuration, and may operate in a different frequency band. Each of the first RF DAC 330 and the second RF DAC 350 includes switched cells. Each cell of the switched cells may include a digital mixer, a digital switch including a plurality of inverters, and a driver, and may have a power voltage (VDD) state and a ground (GND) state.

In each cell in the VDD state, an input signal may be up-converted to an operating frequency through the digital mixer, and a local oscillator (LO) frequency and data may be mixed. A mixed signal may be output to an outside of the corresponding RF DAC 330 or 350 through the inverters and the driver.

A value output from the switched cells may be a sum of multiplications between an LO frequency and data of each cell. A final RF signal may be output from the RF DACs 330 and 350 by adding up power of each cell through on/off operations of capacitors included in each of the RF DACs 330 and 350. In addition, the switched cells may include various structures of each of the RF DACs 330 and 350, and an example of the switched cells will be described with reference to FIG. 7.

When a single RF DAC, for example, the first RF DAC 330, performs a signal transmission operation, the impedance controller 310 operates the capacitors of a remaining single RF DAC, for example, the second RF DAC 350. Through the above operation, the impedance controller 310 may match or adjust impedance of the first RF DAC 330 without using a separate matching circuit.

That is, when the first RF DAC 330 is to transmit desired communication data, the impedance controller 310 may apply the data input signal desired to be output, to a data input of the first RF DAC 330 by controlling the first switch 313, using the control signal. In this example, the impedance controller 310 may apply the second impedance control signal to a data input of the second RF DAC 350 by controlling the second switch 315, using the control signal.

In an example in which impedance matching is twisted, that is, matched impedance becomes unmatched due to the first RF DAC 330 changing a frequency in order to operate in a different frequency band, the impedance controller 310 may search for a control value corresponding to an impedance value optimal for the corresponding frequency band, from the control values stored in the look-up table 135. The impedance controller 310 may apply the found control value as the control signal to the second switch 315 so that the second impedance control signal is transmitted to the second RF DAC 350. As described above, the impedance values pre-calculated for each frequency band, and the control values determined based on the impedance values, are stored in the look-up table 135.

The capacitors connected to the switched cells of the second RF DAC 350 may be turned on or off based on the second impedance control signal applied to the second RF DAC 350. In this example, the turned on or off capacitors of the second RF DAC 350 may form a capacitive power combiner structure with the capacitors of the first RF DAC 330. As a result, the second RF DAC 350 may tune impedance of the first RF DAC 330 to an appropriate value. Through the aforementioned process, the first RF DAC 330 may adaptively maintain impedance at all times.

Figure 4:
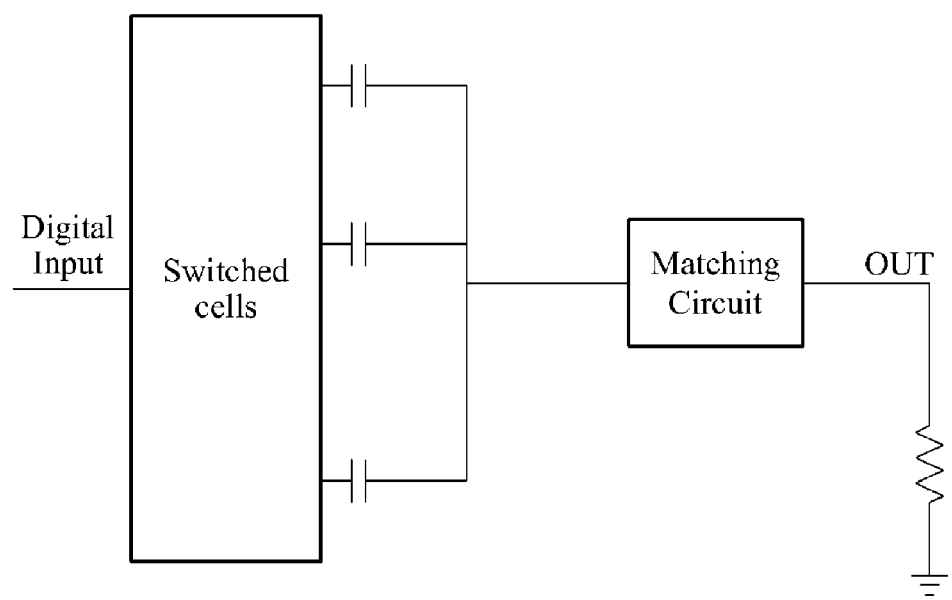
FIG. 4 is a circuit diagram describing an example of an operation of an RF DAC included in a transmitter and an operation between a plurality of capacitors that form a capacitive power combiner structure.

FIG. 4 illustrates an example of an operation of switched cells and a plurality of capacitors included in an RF DAC. Referring to FIG. 4, the switched cells receives digital data as an input, and provides a plurality of voltage signals to the respective capacitors as an output OUT. The capacitors form a capacitive power combiner structure.

The capacitors are used to add up power of the switched cells, and to perform impedance matching to a desired resistance value, by performing shunt or series inductor bonding at an outside of the capacitors. The above impedance matching method may operate in a narrow frequency band. Due to a change in a frequency by, for example, a change in a frequency to be used, designed impedance may be unmatched, which may result in degrading performance of a receiver, efficiency, linearity, and output power.

The transmitter may obtain desired impedance by controlling an on/off operation of capacitors in a capacitive combining structure, using controllability that is a feature of a digital circuit. The transmitter may transmit data of a minimum of two frequencies and a plurality of bands adjacent to each frequency through the capacitive combining structure formed by the RF DACs. The transmitter may transmit data in a desired frequency band by adjusting impedance through the capacitors in the capacitive combining structure.

Capacitors may be included in a remaining RF DAC that excludes a predetermined RF DAC from the RF DACs. Using a plurality of independently operating RF DACs, the transmitter may operate in a plurality of operation modes according to different communication standards.

Figure 5:
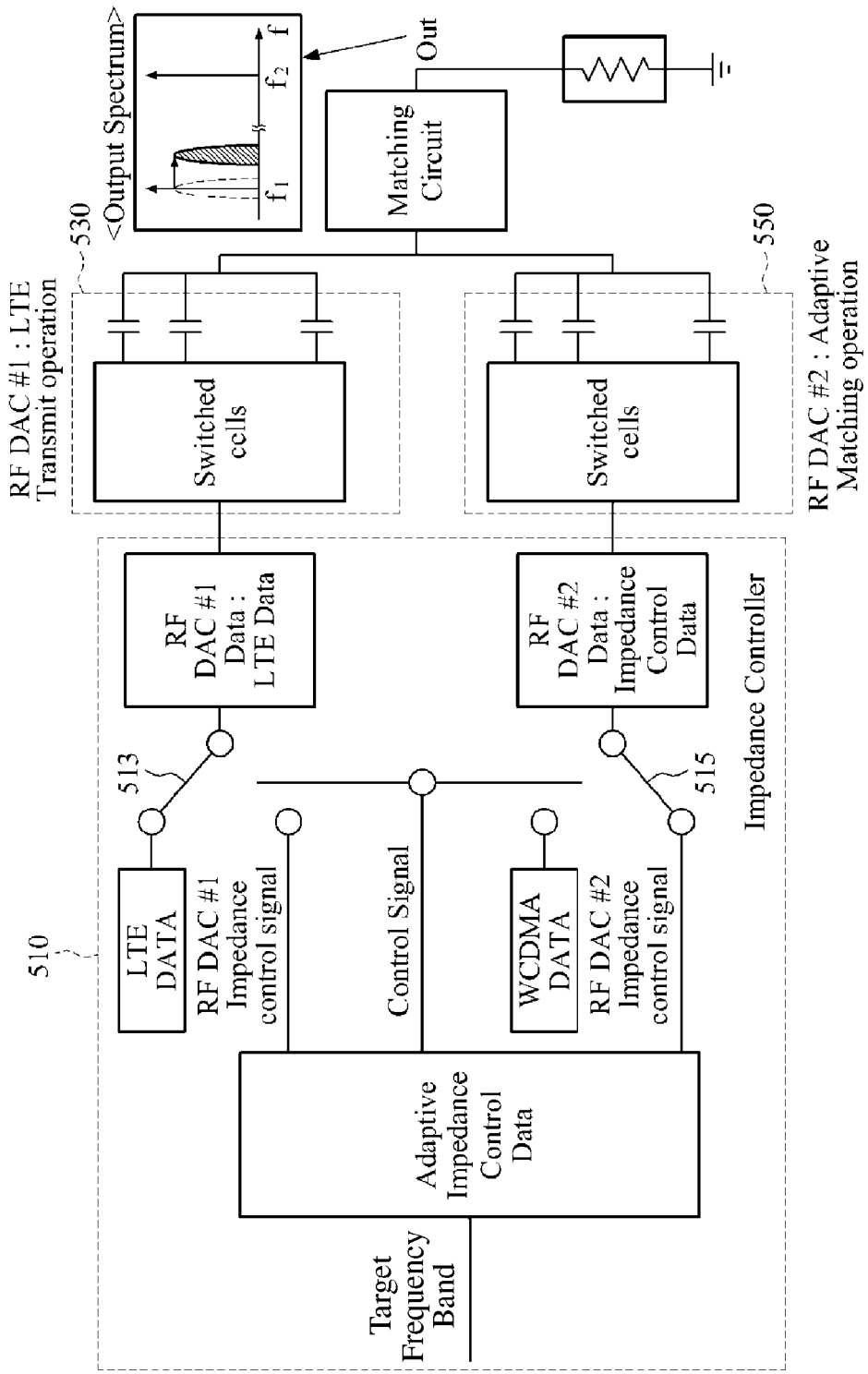
FIG. 5 is a circuit diagram illustrating an example of a transmitter that transmits data in a frequency band that is prepared for long term evolution (LTE) communication.

FIG. 5 illustrates an example of a transmitter that transmits data in a frequency band that is prepared for LTE communication. Referring to FIG. 5, the transmitter includes an impedance controller 510, a first RF DAC 530 (RF DAC #1), and a second RF DAC 550 (RF DAC #2). An operation of the second RF DAC 550 in an example in which the first RF DAC 530 operates as an LTE signal transmitter will be described with reference to FIG. 5.

In an example in which an LTE frequency band or a frequency band adjacent thereto is input as a target frequency band of the transmitter, the impedance controller 510 connects a first switch 513 to LTE data, and connects a second switch 515 to an impedance control signal (RF DAC #2 impedance control signal), using a control signal generated based on the target frequency band. Accordingly, the LTE data is input to the first RF DAC 530, and the first RF DAC 530 operates as the LTE signal transmitter that transmits an LTE signal. The impedance control signal is input to the second RF DAC 550, and the second RF DAC 550 operates as an impedance compensator that compensates for or matches the impedance of the first RF DAC 530 based on the impedance control signal.

In response to the LTE signal being transmitted from the first RF DAC 530, the impedance controller 510 applies, to the second RF DAC 550, the impedance control signal (RF DAC #2 impedance control signal) to adjust a frequency range of the LTE frequency band. The impedance controller 510 controls a plurality of capacitors included in the second RF DAC 550 by applying, to the second RF DAC 550, the impedance control signal (RF DAC #2 impedance control signal) to adjust the LTE frequency band.

For example, when only the first RF DAC 530 operates, an output spectrum may be expressed as a first frequency $f_1$ indicated by a dotted line. When the first RF DAC 530 needs to support another frequency band, an input frequency moves to a right side of the first frequency $f_1$, and thus, output impedance matching is twisted, that is, matched impedance becomes unmatched.

The impedance controller 510 adaptively matches impedance to the right side of the first frequency $f_1$ by applying power voltage to the capacitors included in the second RF DAC 550 based on control values stored in a look-up table. Accordingly, the first RF DAC 530 may have the optimal impedance for LTE data transmission.

Even though a role of the first RF DAC 530 and a role of the second RF DAC 550 are switched, the same operation may be performed. The example in which the role of the first RF DAC 530 and the role of the second RF DAC 550 are switched will be described with reference to FIG. 6.

Figure 6:
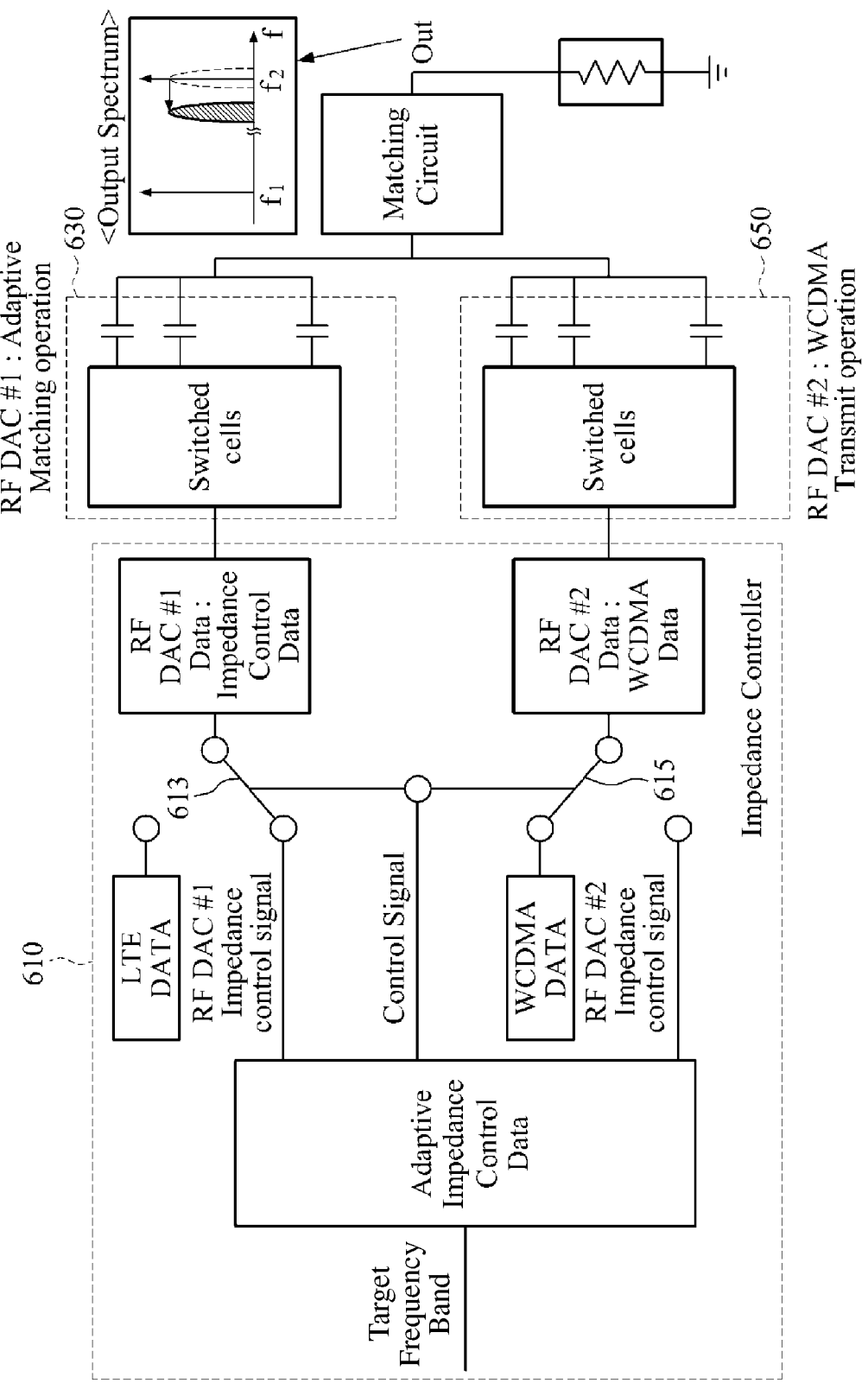
FIG. 6 is a circuit diagram illustrating an example of a transmitter that transmits data in a frequency band that is prepared for wideband code division multiple access (WCDMA) communication.

FIG. 6 illustrates an example of a transmitter that transmits data in a frequency band that is prepared for WCDMA communication. Referring to FIG. 6, the transmitter includes an impedance controller 610, a first RF DAC 630 (RF DAC #1), and a second RF DAC 650 (RF DAC #2). An operation of the first RF DAC 630 in an example in which the second RF DAC 650 operates as a WCDMA signal transmitter will be described with reference to FIG. 6.

In an example in which a WCDMA frequency band or a frequency band adjacent thereto is input as a target frequency band of the transmitter, the impedance controller 610 connects a second switch 615 to WCDMA data, and connects a first switch 613 to an impedance control signal (RFD AC #1 impedance control signal), using a control signal generated based on the target frequency band. Accordingly, the WCDMA data is input to the second RF DAC 650, and the second RF DAC 650 operates as the WCDMA signal transmitter that transmits an WCDMA signal. The impedance control signal is input to the first RF DAC 630, and the first RF DAC 630 operates as an impedance compensator that compensates for or matches the impedance of the second RF DAC 650 based on the impedance control signal.

In response to the WCDMA signal being transmitted from the second RF DAC 650, the impedance controller 610 applies, to the first RF DAC 630, the impedance control signal (RF DAC #1 impedance control signal) to adjust a frequency range of the WCDMA frequency band. The impedance controller 610 controls a plurality of capacitors included in the first RF DAC 630 by applying, to the first RF DAC 630, the impedance control signal (RF DAC #1 impedance control signal) to adjust the WCDMA frequency band.

For example, when only the second RF DAC 650 operates, an output spectrum may be expressed as a second frequency $f_2$ indicated by a dotted line. When the second RF DAC 650 needs to support another frequency band, an input frequency moves to a left side of the second frequency $f_2$, and thus, output impedance matching is twisted, that is, matched impedance becomes unmatched.

The impedance controller 610 adaptively matches impedance to the left side of the second frequency $f_2$ by applying power voltage to the capacitors included in the first RF DAC 630 based on control values stored in a look-up table. Accordingly, the second RF DAC 650 may have the optimal impedance for WCDMA data transmission.

Figure 7:
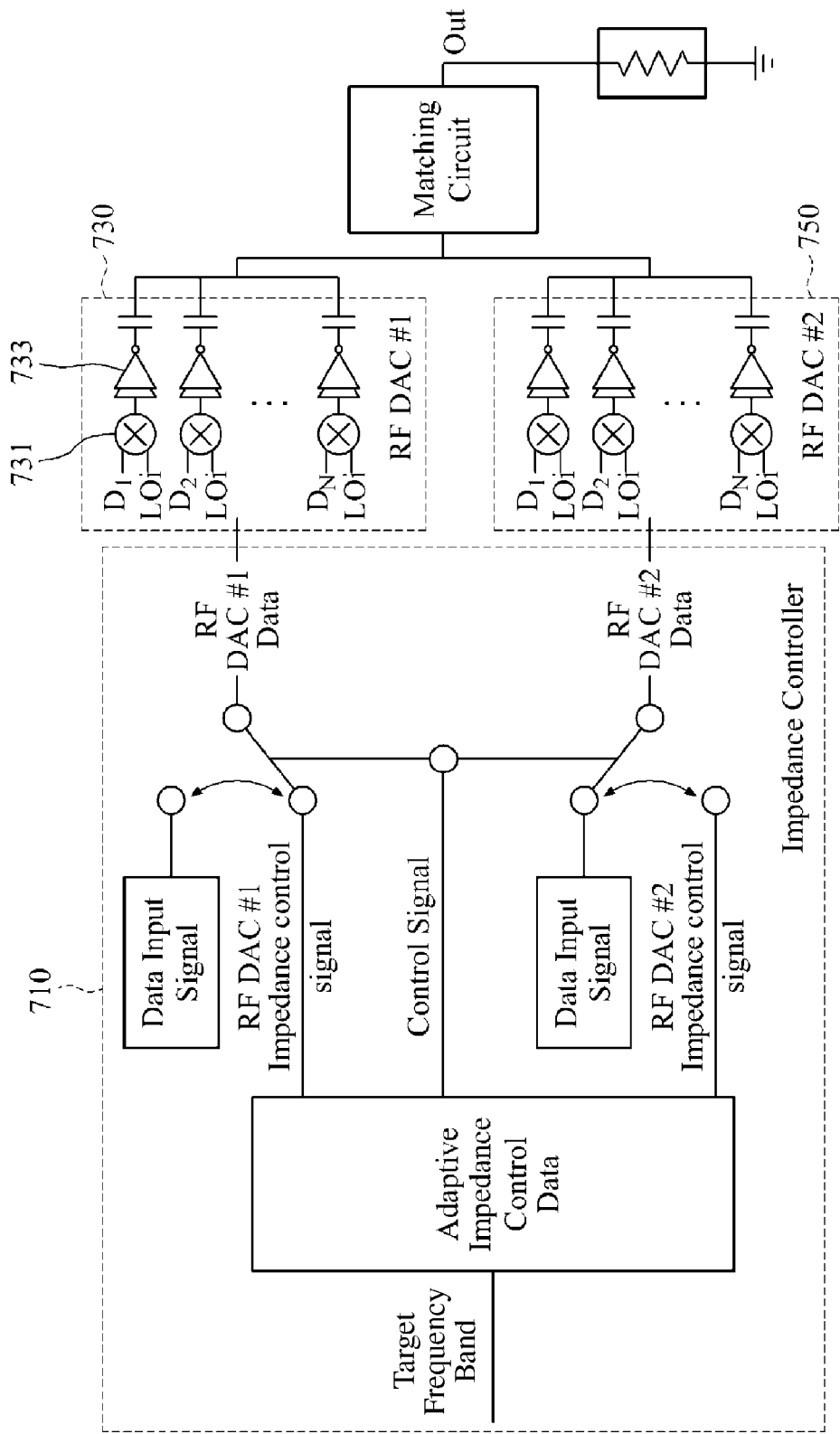
FIG. 7 is a circuit diagram illustrating another example of a transmitter that supports a multimode and a multiband, using a plurality of RF DACs.

FIG. 7 illustrates another example of a transmitter that supports a multimode and a multiband, using a plurality of RF DACs. Referring to FIG. 7, the transmitter includes an impedance controller 710, a first RF DAC 730 (RF DAC #1), and a second RF DAC 750 (RF DAC #2).

Each of the first RF DAC 730 and the second RF DAC 750 includes switched cells that may include the same structure as FIG. 3. Each cell of the switched cells includes a digital mixer 731, a digital switch 733 that includes a plurality of inverters, and a driver (not shown). Each cell of the switched cells has a VDD state and a GND state.

In each cell of the VDD state, the digital mixer 731 up-converts an input signal to an operating frequency by mixing an LO frequency $LO_i$ and data D of the input signal. The mixed signal is output to an outside of an RF DAC through the digital switch 733 and the driver.

A value output from the switched cells is a sum of multiplications between an LO frequency $LO_i$ and data D of each cell. A final RF signal is output from the RF DACs 730 and 750 by adding up power of each cell through on/off operations of capacitors included in each RF DAC.

Figure 8:
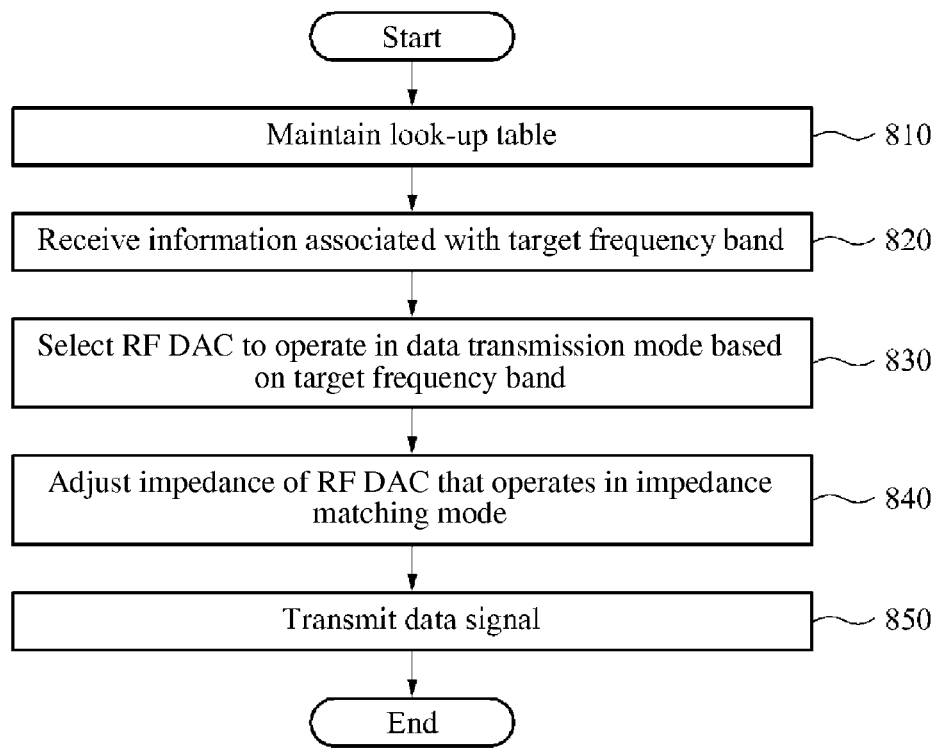
FIG. 8 is a flowchart illustrating an example of a control method of a transmitter that supports a multimode and a multiband, using a plurality of RF DACs.

FIG. 8 illustrates an example of a control method of a transmitter that supports a multimode and a multiband, using a plurality of RF DACs. Referring to FIG. 8, in operation 810, the transmitter maintains a look-up table.

The look-up table may store impedance values pre-calculated for each frequency band based on a number of a plurality of capacitors included in each of a first RF DAC that operates in a first frequency band and a second RF DAC that operates in a second frequency band that is different from the first frequency band. The look-up table may also store control values to be used to control operations of the first RF DAC and the second RF DAC, respectively, based on the impedance values pre-calculated for each frequency band.

In operation 820, the transmitter receives information associated with a target frequency band in which data is to be transmitted.

In operation 830, the transmitter selects an RF DAC to operate in a data transmission mode from the first RF DAC and the second RF DAC, based on the target frequency band.

In operation 840, the transmitter adjusts impedance of an RF DAC that operates in an impedance matching mode (i.e., that is not selected to operate in the data transmission mode) in order to adjust a frequency range of the selected RF DAC that operates in the data transmission mode. The transmitter may generate a control signal to be used to control the RF DAC that operates in the impedance matching mode based on the control values stored in the look-up table, and may adjust the impedance of the RF DAC that operates in the impedance matching mode, using the control signal.

In operation 850, the transmitter transmits a data signal to be transmitted, to the RF DAC that operates in the data transmission mode.

Even though a plurality of channels is selected through a single communication scheme or a plurality of communication schemes, using different target frequency bands, the examples of the transmitter described may transmit data, using a plurality of RF DACs, each of which including a capacitive power combiner structure. Accordingly, even though a different communication frequency is allocated to each communication provider, communication may be performed using the single transmitter. As such, cost may be saved.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A transmitter configured to support a multimode and a multiband, using radio frequency (RF) digital-to-analog converters (DACs), the transmitter comprising:
    a first RF DAC configured to transmit a first signal in a first frequency band for a first communication;
    a second RF DAC configured to transmit a second signal in a second frequency band for a second communication, the second frequency band being different from the first frequency band; and
    an impedance controller configured to
        select one of the first RF DAC and the second RF DAC to operate in a data transmission mode, and select the other of the first RF DAC and the second RF DAC to operate in an impedance matching mode, based on which of the first frequency band and the second frequency band is determined to include or be adjacent to a target frequency band, and
        adjust, based on the target frequency band, an impedance of the other of the first RF DAC and the second RF DAC operating in the impedance matching mode, to adjust a frequency range of the one of the first RF DAC and the second RF DAC operating in the data transmission mode,
    wherein the impedance matching mode is a mode in which a respective RF DAC performs impedance matching, by functioning as a shunt capacitor.

2. The transmitter of claim 1, wherein each of the first RF DAC and the second RF DAC comprises capacitors configured to be a capacitive power combiner.

3. The transmitter of claim 2, wherein the impedance controller comprises a look-up table configured to store impedance values pre-calculated for each of frequency bands based on a number of the capacitors comprised in each of the first RF DAC and the second RF DAC.

4. The transmitter of claim 3, wherein the look-up table is further configured to store control values to be used to control the first RF DAC and the second RF DAC, based on the impedance values.

5. The transmitter of claim 4, wherein the impedance controller is configured to generate a control signal to be used to control the first RF DAC and the second RF DAC, based on the control values.

6. The transmitter of claim 5, wherein in response to the control signal indicating that the first RF DAC is to transmit the first signal, the impedance controller is configured to apply, to the second RF DAC, an impedance control signal to control a frequency range of the first frequency band.

7. The transmitter of claim 6, wherein the impedance controller is configured to control the capacitors comprised in the second RF DAC by applying the impedance control signal to the second RF DAC.

8. The transmitter of claim 5, wherein in response to the control signal indicating that the second RF DAC is to transmit the second signal, the impedance controller is configured to apply, to the first RF DAC, an impedance control signal to control a frequency range of the second frequency band.

9. The transmitter of claim 8, wherein the impedance controller is configured to control the capacitors comprised in the first RF DAC by applying the impedance control signal to the first RF DAC.

10. The transmitter of claim 5, further comprising:
a third RF DAC configured to transmit a third signal in a third frequency band different from the first frequency band and the second frequency band,
wherein in response to the control signal indicating that the third RF DAC is to transmit the third signal, the impedance controller is configured to apply, to the first RF DAC and the second RF DAC, an impedance control signal to control a frequency range of the third frequency band.

11. The transmitter of claim 1, wherein the first RF DAC and the second RF DAC are configured to complementarily operate based on the data transmission mode and the impedance matching mode, respectively.

12. The transmitter of claim 1, wherein the first communication comprises a long term evolution (LTE) communication, and the second communication comprises a wideband code division multiple access (WCDMA) communication.

13. A control method of a transmitter configured to support a multimode and a multiband, using radio frequency (RF) digital-to-analog converters (DACs), the method comprising:
selecting one of a first RF DAC and a second RF DAC to operate in a data transmission mode, the first RF DAC being configured to operate in a first frequency band for a first communication, the second RF DAC being configured to operate in a second frequency band for a second communication, the second frequency band being different from the first frequency band, and the other of the first RF DAC and the second RF DAC being selected to operate in an impedance matching mode, based on which of the first frequency band and the second frequency band is determined to include or be adjacent to a target frequency band in which data is to be transmitted;
adjusting, based on the target frequency band, an impedance of the other of the first RF DAC and the second RF DAC operating in the impedance matching mode, to adjust a frequency range of the selected one of the first RF DAC and the second RF DAC operating in the data transmission mode; and
transmitting a data signal using the selected one of the first RF DAC and the second RF DAC operating in the transmission mode,
wherein the impedance matching mode is a mode in which a respective RF DAC performs impedance matching, by functioning as a shunt capacitor.

14. The method of claim 13, further comprising:
maintaining a look-up table configured to store impedance values pre-calculated for each of frequency bands based on a number of capacitors comprised in each of the first RF DAC or the second RF DAC.

15. The method of claim 14, wherein the look-up table is further configured to store control values to be used to control the first RF DAC and the second RF DAC, based on the impedance values.

16. The method of claim 15, wherein the adjusting comprises:
generating a control signal to be used to control the other one of the first RF DAC and the second RF DAC operating in the impedance matching mode, based on the control values.

17. The method of claim 13, wherein each of the first RF DAC and the second RF DAC comprises capacitors configured to be a capacitive power combiner.

18. The method of claim 13, wherein the first RF DAC and the second RF DAC are configured to complementarily operate based on the data transmission mode and the impedance matching mode, respectively.

19. A non-transitory computer-readable storage medium storing a program comprising instructions to cause a computer to perform the method of claim 13.

20. A transmitter comprising:
a first digital-to-analog converter (DAC) configured to operate in a first frequency band for a first communication;
a second DAC configured to operate in a second frequency band for a second communication, the second frequency band being different from the first frequency band; and
an impedance controller configured to
select one of the first DAC and the second DAC to transmit data in a data transmission mode, and the other of the first DAC and the second DAC to operate in an impedance matching mode, based on which of the first frequency band and the second frequency band is determined to include or be adjacent to a target frequency band in which the data is to be transmitted, and
adjust, based on the target frequency band, an impedance of the other of the first DAC and the second DAC operating in the impedance matching mode, to adjust a frequency range of the selected one of the first DAC and the second DAC operating in the data transmission mode,
wherein the impedance matching mode is a mode in which a respective RF DAC performs impedance matching, by functioning as a shunt capacitor.

21. The transmitter of claim 20, wherein the impedance controller comprises a first switch connected to the first DAC, and a second switch connected to the second DAC.

22. The transmitter of claim 21, wherein the impedance controller is configured to:
control the first switch to apply the data to the first DAC, and control the second switch to apply an impedance control signal to the second DAC to adjust the first frequency band, in response to the target frequency band being equal to the first frequency band.

23. The transmitter of claim 21, wherein the impedance controller is configured to:
control the second switch to apply the data to the second DAC, and control the first switch to apply an impedance control signal to the first DAC to adjust the second frequency band, in response to the target frequency band being equal to the second frequency band.

\* \* \* \* \*